(12) United States Patent
Dass et al.

(10) Patent No.: US 11,542,006 B2
(45) Date of Patent: Jan. 3, 2023

(54) GALLEY CART ASSEMBLY AND AN AIRCRAFT THAT UTILIZES THE GALLEY CART ASSEMBLY

(71) Applicant: The Boeing Company, Chicago, IL (US)

(72) Inventors: Ranjith George Dass, Bangalore (IN); Hafza Kareem Kurungattu Valappil, Palakkad (IN); Abhay Joshi, Bengaluru (IN)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/370,517

(22) Filed: Jul. 8, 2021

(65) Prior Publication Data

US 2022/0144436 A1 May 12, 2022

Related U.S. Application Data

(60) Provisional application No. 63/110,520, filed on Nov. 6, 2020.

(51) Int. Cl.
*B64D 11/00* (2006.01)
*B62B 3/00* (2006.01)
(Continued)

(52) U.S. Cl.
CPC ............ *B64D 11/0007* (2013.01); *B62B 3/00* (2013.01); *B62B 5/0043* (2013.01);
(Continued)

(58) Field of Classification Search
CPC ..... B64D 11/0007; B62B 3/00; B62B 5/0043; B62B 5/0053; B62B 5/0069; B62B 5/0404
See application file for complete search history.

(56) References Cited

U.S. PATENT DOCUMENTS 9,643,638 B1 * 5/2017 Wittliff, III .......... G05D 1/0016
11,195,159 B1 * 12/2021 Alkasimi ............... B64D 11/00
(Continued)

FOREIGN PATENT DOCUMENTS

DE  102019108488 A1 * 10/2020
EP     3501986 A1 * 6/2019 ............. B64D 11/00
(Continued)

*Primary Examiner* — James A Shriver, II
*Assistant Examiner* — Ian Bryce Shelton
(74) *Attorney, Agent, or Firm* — Quinn IP Law

(57) ABSTRACT

A galley cart assembly that includes a cart and a wheel assembly attached to the cart. The wheel assembly includes a plurality of wheels and a drive assembly configured to drive one or more of the plurality of wheels to propel the cart. The wheel assembly also includes a primary brake assembly to lock one or more of the plurality of wheels to prevent movement of the cart. Furthermore, the galley cart assembly includes a controller coupled to the cart and including a processor and a memory. The controller includes a turbulence monitoring system configured to detect a turbulence event. The controller is in communication with the wheel assembly, and is configured to automatically operate the primary brake assembly to lock the cart in position when the turbulence monitoring system detects the turbulence event. In certain configurations, an aircraft includes the galley cart assembly.

22 Claims, 4 Drawing Sheets

(51) Int. Cl.
*B62B 5/04* (2006.01)
*B62B 5/00* (2006.01)

(52) U.S. Cl.
CPC .......... *B62B 5/0053* (2013.01); *B62B 5/0069* (2013.01); *B62B 5/0404* (2013.01)

(56) References Cited

U.S. PATENT DOCUMENTS

| | | | |
|---|---|---|---|
| 2002/0130219 A1* | 9/2002 | Parseghian | B64C 1/18 244/118.6 |
| 2014/0021690 A1* | 1/2014 | Burd | B64D 11/0007 280/47.35 |
| 2018/0282075 A1* | 10/2018 | Allen | G05B 19/41895 |
| 2018/0308037 A1* | 10/2018 | Cloyd | B64D 11/0007 |
| 2019/0009910 A1* | 1/2019 | Bates | B64D 11/0007 |
| 2019/0116394 A1* | 4/2019 | Kinoshita | H04N 21/8456 |
| 2019/0154838 A1* | 5/2019 | Sasaki | G01S 19/11 |
| 2019/0308652 A1* | 10/2019 | Green | B60T 7/22 |
| 2019/0311318 A1* | 10/2019 | Bauer | B65G 1/0492 |
| 2019/0314993 A1* | 10/2019 | Orr | B64D 11/0007 |
| 2020/0039664 A1* | 2/2020 | Nicks | G05D 1/027 |
| 2020/0108932 A1* | 4/2020 | Vandewall | F25D 17/06 |
| 2020/0115057 A1* | 4/2020 | Chylinski | B64D 11/0007 |
| 2020/0339262 A1* | 10/2020 | Claflin | B64D 11/0007 |
| 2020/0346679 A1* | 11/2020 | Kim | B62B 5/0043 |
| 2021/0253254 A1* | 8/2021 | Stephens | B67D 1/0888 |
| 2021/0259406 A1* | 8/2021 | Mascaretti | A47B 31/00 |
| 2021/0362761 A1* | 11/2021 | Page | B62B 5/00 |
| 2022/0105975 A1* | 4/2022 | Dowty | B62B 3/003 |

FOREIGN PATENT DOCUMENTS

| | | | | |
|---|---|---|---|---|
| WO | WO-2013136283 A2 * | 9/2013 | | A47B 31/02 |
| WO | WO-2016060561 A1 * | 4/2016 | | B64D 11/0007 |

* cited by examiner

GALLEY CART ASSEMBLY AND AN AIRCRAFT THAT UTILIZES THE GALLEY CART ASSEMBLY

CROSS-REFERENCE TO RELATED APPLICATIONS

This application claims the benefit of U.S. Provisional Application No. 63/110,520, filed on Nov. 6, 2020, which is hereby incorporated by reference in its entirety.

BACKGROUND

A crew member may direct a galley cart up and down one or more aisles of an aircraft to service passengers of the aircraft. Generally, the galley cart is pushed or pulled via the crew member to the desired location. The galley cart may be manually locked in place via the crew member when a desired location is reached along the aisle.

However, if turbulence occurs, the crew member may not be able to manually lock the galley cart in place before the turbulence causes undesirable movement of the galley cart.

SUMMARY

Therefore, there is a need for a galley cart assembly that automatically locks a cart in position due to turbulence or potential upcoming turbulence.

The present disclosure provides a galley cart assembly that includes a cart and a wheel assembly attached to the cart. The wheel assembly includes a plurality of wheels and a drive assembly configured to drive one or more of the plurality of wheels to propel the cart. The wheel assembly also includes a primary brake assembly to lock one or more of the plurality of wheels to prevent movement of the cart. Furthermore, the galley cart assembly includes a controller coupled to the cart and including a processor and a memory. The controller includes a turbulence monitoring system configured to detect a turbulence event. The controller is in communication with the wheel assembly, and is configured to automatically operate the primary brake assembly to lock the cart in position when the turbulence monitoring system detects the turbulence event.

The present disclosure provides an aircraft that includes a fuselage. The fuselage includes a cabin having a plurality of seats and an aisle adjacent the plurality of seats. The aircraft also includes an onboard network system coupled to the fuselage, and the galley cart assembly, discussed in the paragraph above, which is selectively movable along the aisle. Furthermore, the controller is in communication with the onboard network system.

The detailed description and the drawings or FIGS. are supportive and descriptive of the disclosure, but the claim scope of the disclosure is defined solely by the claims. While some of the best modes and other configurations for carrying out the claims have been described in detail, various alternative designs and configurations exist for practicing the disclosure defined in the appended claims.

Figure 1:
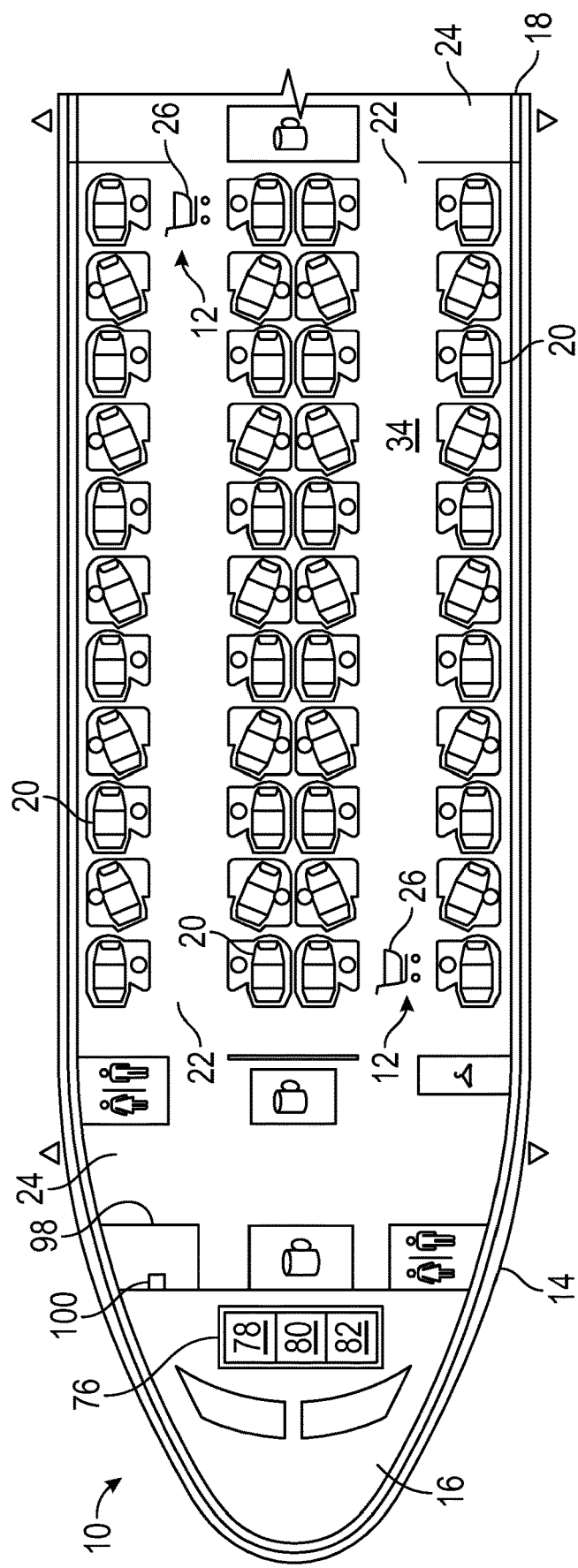
FIG. 1 is a schematic illustration of part of an aircraft, with a galley cart assembly disposed in each aisle of a cabin of the aircraft.

The present disclosure may be extended to modifications and alternative forms, with representative configurations shown by way of example in the drawings and described in detail below. Inventive aspects of the disclosure are not limited to the disclosed configurations. Rather, the present disclosure is intended to cover modifications, equivalents, combinations, and alternatives falling within the scope of the disclosure as defined by the appended claims.

DETAILED DESCRIPTION

Those having ordinary skill in the art will recognize that all directional references (e.g., above, below, upward, up, downward, down, top, bottom, left, right, vertical, horizontal, etc.) are used descriptively for the FIGS. to aid the reader's understanding, and do not represent limitations (for example, to the position, orientation, or use, etc.) on the scope of the disclosure, as defined by the appended claims.

Referring to the figures, wherein like numerals indicate like or corresponding parts throughout the several views, an aircraft 10 and a galley cart assembly 12 are generally shown in FIG. 1. As detailed below, the galley cart assembly 12 may be used in the aircraft 10. Other non-limiting examples that the galley cart assembly 12 may be used in include, a vehicle, such as a motor vehicle, etc., a watercraft, a railcar, etc.

Referring to FIG. 1, the aircraft 10 may include a fuselage 14, a cockpit 16, and a plurality of wings (not shown) attached to the fuselage 14, as well as other components not specifically described herein. The fuselage 14 may include a cabin 18 having a plurality of seats 20 and an aisle 22 adjacent the plurality of seats 20. Passengers and crew members may move along the aisle 22 for various reasons. Furthermore, the galley cart assembly 12 is selectively movable along the aisle 22. Optionally, the cabin 18 may include a plurality of aisles 22, and the galley cart assembly 12 may move along any of the plurality of aisles 22. For illustrative purposes, FIG. 1 illustrates one suitable configuration of the cabin 18, which has two aisles 22 between three rows of the plurality of seats 20. It is to be appreciated that the cabin 18 may be configured with a different aisle 22 and row of seats 20 configuration than what is illustrated in FIG. 1.

Continuing with FIG. 1, the cabin 18 may include a galley 24 that stores various inventory, such as beverages, food, condiments, etc., and other items such as silverware, cups, napkins, blankets, pillows, electronic components, such as earphones, etc. The galley 24 may be located away from the location where the passengers are seated. For example, one galley 24 may be disposed proximal to the cockpit 16, and optionally, another galley 24 may be disposed proximal to a tail of the aircraft 10.

Again continuing with FIG. 1, the galley cart assembly 12 includes a cart 26, and the cart 26 may store some of the various inventory, examples of which are noted above. Therefore, the cart 26 may include a compartment 28 that houses or stores the various inventory. A crew member may direct the cart 26 up and down one or more of the plurality of aisles 22 of the aircraft 10 to service the passengers of the aircraft 10. For illustrative purposes, FIG. 1 illustrates one cart 26 in one of the aisles 22 and another cart 26 in another one of the aisles 22. As such, it is to be appreciated that more than one galley cart assembly 12 may be used in the aircraft 10, and therefore, the discussion herein for the galley cart assembly 12 applies to any number of galley cart assemblies 12.

Figure 2:
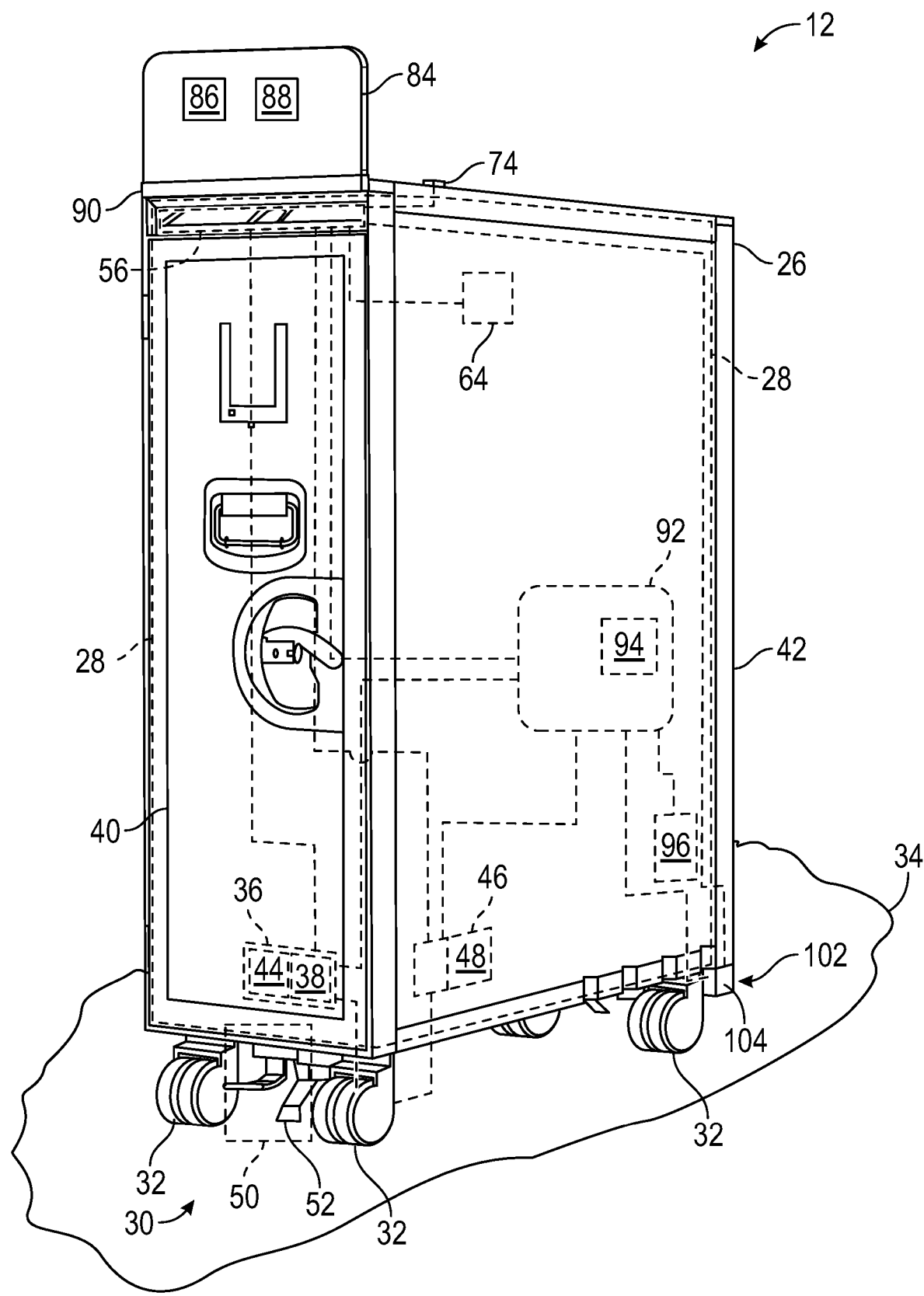
FIG. 2 is a schematic perspective view of the galley cart assembly that may be used in FIG. 1.
Figure 5:
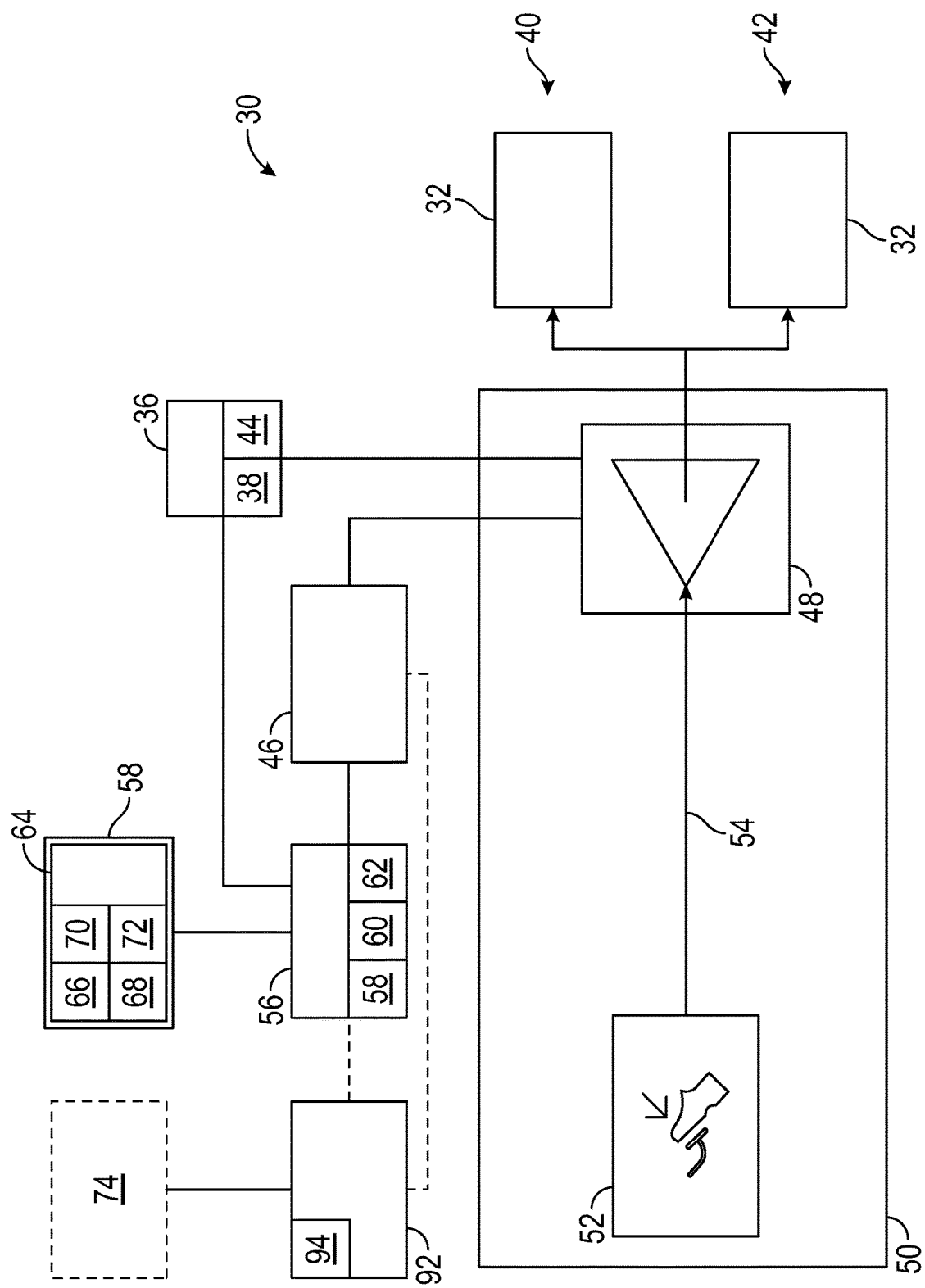
FIG. 5 is a schematic illustration of various components of the galley cart assembly, illustrating, for example, a primary brake assembly and a secondary brake assembly cooperating with a plurality of wheels.

Referring to FIGS. 2 and 5, the galley cart assembly 12 includes a wheel assembly 30 attached to the cart 26. Generally, the wheel assembly 30 allows the cart 26 to be propelled or locked in place. The wheel assembly 30 includes a plurality of wheels 32, and the plurality of wheels 32 may be disposed under the cart 26. That is, the plurality of wheels 32 move along a floor 34 of the cabin 18. The plurality of wheels 32 may rotate or move in any suitable way to move the cart 26.

Optionally, the wheel assembly 30 may include a first shaft that rotatably connects two or more of the plurality of wheels 32, and optionally includes a second shaft that rotatably connects another two or more of the plurality of wheels 32. It is to be appreciated that all or some of the plurality of wheels 32 may move independently relative to each other, i.e., not connected via the first shaft or the second shaft.

The cart 26 may be power driven to assist the crew member with navigating the cart 26 through the aisle 22 of the cabin 18 effortlessly. Therefore, the wheel assembly 30 also includes a drive assembly 36 (see FIGS. 2 and 5) configured to drive one or more of the plurality of wheels 32 to propel the cart 26. That is, the drive assembly 36 may provide a power assist to the crew member by driving the cart 26 without the crew member having to manually push or pull the cart 26. The drive assembly 36 may be coupled to the first shaft and/or the second shaft to drive the plurality of wheels 32. Alternatively, when the plurality of wheels 32 are not connected via the first shaft and/or the second shaft, then the drive assembly 36 may be coupled to one or more of the plurality of wheels 32 to drive the respective one or more of the plurality of wheels 32.

The drive assembly 36 may include any suitable actuator to propel the cart 26. For example, the drive assembly 36 may include a motor 38 coupled to one of the plurality of wheels 32, and the motor 38 is activated to move the one of the plurality of wheels 32 to propel the cart 26. In certain configurations, the motor 38 is coupled to more than one of the plurality of wheels 32. Generally, the motor 38 may provide power to drive the one or more of the plurality of wheels 32. The motor 38 may be incorporated into one or more of the plurality of wheels 32, or alternatively, the motor 38 may be external to the plurality of wheels 32, and configured to drive the first shaft, the second shaft, and/or one or more of the plurality of wheels 32 externally. For example, as shown in FIG. 5 as one non-limiting example, when the motor 38 is activated, the motor 38 may move one of the plurality of wheels 32 along a front 40 of the cart 26 and one of the plurality of wheels 32 along a rear 42 of the cart 26. Additional non-limiting examples of the actuator may include a hub-less motor, an electric motor, etc.

The drive assembly 36 may be activated via the crew member when the crew member is ready to move the cart 26 along the aisle 22. For example, the drive assembly 36 may include an activator 44, such as a switch, a button, a pedal, etc., that is in electrical communication with the actuator, such as the motor 38 of the drive assembly 36. When the activator 44 is engaged, the motor 38 may be activated to drive the cart 26.

Continuing with FIG. 5, the wheel assembly 30 includes a primary brake assembly 46 to lock one or more of the plurality of wheels 32 to prevent movement of the cart 26. Generally, the primary brake assembly 46 is coupled to the one or more of the plurality of wheels 32. As discussed below, the primary brake assembly 46 may automatically lock the one or more of the plurality of wheels 32 which locks the cart 26 in place in response to certain events or conditions which are discussed further below. The primary brake assembly 46 may be incorporated into one or more of the plurality of wheels 32, or alternatively, the primary brake assembly 46 may be external to the plurality of wheels 32, and configured to lock the first shaft, the second shaft, and/or one or more of the plurality of wheels 32 externally.

For example, the primary brake assembly 46 may include a locking feature 48 that is automatically activated to prevent movement of the one or more of the plurality of wheels 32 to lock the cart 26 in position. The locking feature 48 may engage one or more of the plurality of wheels 32, the first shaft and/or the second shaft when activated. The locking feature 48 may include a brake shoe, a lever, an actuator to engage the lever, etc. As one non-limiting example, as shown in FIG. 5, the primary brake assembly 46 may lock one of the plurality of wheels 32 along the front 40 of the cart 26, and lock another one of the plurality of wheels 32 along the rear 42 of the cart 26.

Referring to FIGS. 2 and 5, the wheel assembly 30 may also include a secondary brake assembly 50 operable separately from the primary brake assembly 46. The secondary brake assembly 50 is configured to manually lock the cart 26 in position independently of the automatic locking of the primary brake assembly 46. That is, the primary brake assembly 46 and the secondary brake assembly 50 operate independently of each other, i.e., one manually and one automatically. The secondary brake assembly 50 provides a redundancy braking feature in case a fault occurs with the automatic locking of the primary brake assembly 46.

The crew member may engage the secondary brake assembly 50 manually to lock the cart 26 in place. The secondary brake assembly 50 may be coupled to one or more of the plurality of wheels 32. For example, the secondary brake assembly 50 may include a pedal 52 that when the pedal 52 is depressed, one or more of the plurality of wheels 32 locks the cart 26 in place. The pedal 52 protrudes from the cart 26 such that the crew member may manually access the pedal 52, for example, via the crew member's foot.

The secondary brake assembly 50 may include a shaft 54 (see FIG. 5) coupled to the pedal 52 and the locking feature 48. Therefore, when the crew member depresses the pedal 52, the shaft 54 moves to cause the brake shoe to engage the first shaft and/or the second shaft, or engage one or more of the plurality of wheels 32 individually. As one non-limiting example, as shown in FIG. 5, the secondary brake assembly 50 may lock one of the plurality of wheels 32 along the front 40 of the cart 26, and lock another one of the plurality of wheels 32 along the rear 42 of the cart 26.

The wheel assembly 30 may optionally be retrofitted to the cart 26. Therefore, the wheel assembly 30 may include one or more units that is installed on the cart 26. This optional retrofitting feature provides a cost savings by being able to implement the wheel assembly 30 without having to replace the entire cart, and provides a design easy to install.

Figure 3:
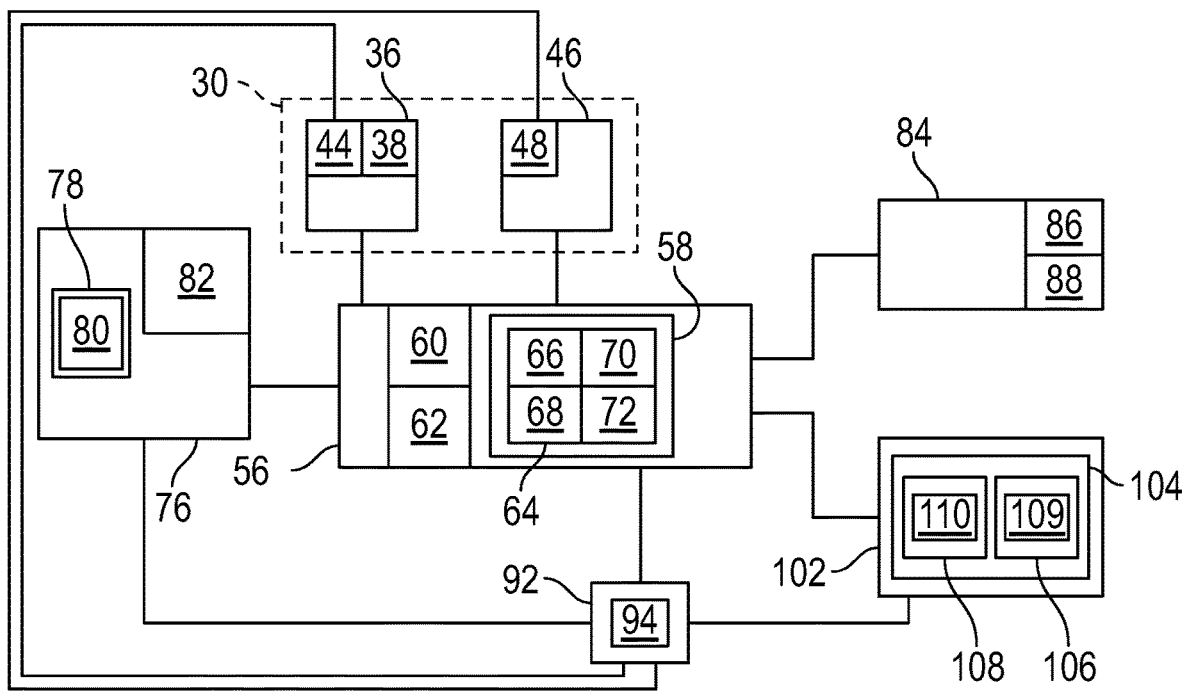
FIG. 3 is a schematic illustration of a communications flowchart.

Referring to FIGS. 3 and 5, the galley cart assembly 12 also includes a controller 56 in communication with various components, systems, devices, etc., some of which are discussed below. Generally, the controller 56 is coupled to the cart 26, and in communication with the primary brake assembly 46 and optionally in communication with the drive assembly 36. Therefore, when certain events or conditions occur, the controller 56 may signal the drive assembly 36 to deactivate and automatically activate the primary brake assembly 46 to lock the cart 26 in place. In certain configurations, the controller 56 may be mounted to the cart 26 either inside or outside of the compartment 28 of the cart 26.

The controller 56 includes a turbulence monitoring system 58 configured to detect a turbulence event. The turbulence event may include real-time environmental conditions and/or potential environmental conditions. As discussed further below, when the turbulence monitoring system 58 detects the turbulence event, the primary brake assembly 46 is autonomously locked. In other words, the crew member does not have to perform any action to lock the cart 26 in place when the turbulence event is detected or occurs. The controller 56 automatically signals the primary brake assembly 46 to activate autonomously. As mentioned above, the primary brake assembly 46 may include the locking feature 48, and thus, the locking feature 48 may be automatically activated to prevent movement of the one or more of the plurality of wheels 32 to lock the cart 26 in position when the turbulence monitoring system 58 detects the turbulence event. By automatically locking the cart 26 in place during certain events or conditions, or for potential events or conditions, undesirable engagement of the cart 26 with another object, such as one or more of the plurality of seats 20, the crew member, or one or more of the passengers of the aircraft 10, etc., may be minimized.

For example, real-time movements of the cart 26 and/or the aircraft 10 may cause the turbulence monitoring system 58 to detect the turbulence event. Real-time movements may occur due to the weather outside of the aircraft 10 and/or movements of the aircraft 10 via a pilot/autopilot of the aircraft 10. These types of events are therefore based on the real-time environmental conditions.

As another example, common turbulence areas along a route that the aircraft 10 is traveling may cause the turbulence monitoring system 58 to detect the turbulence event. These types of events are therefore based on the potential environmental conditions. That is, the turbulence event may be based on a pre-programmed route that the aircraft 10 is traveling and/or based on current conditions of turbulence (as discussed above). The turbulence monitoring system 58 may include the pre-programmed route that identifies potential locations of the turbulence event. Therefore, when the aircraft 10 reaches a certain location along the pre-programmed route, the primary brake assembly 46 may be automatically activated, via the controller 56, to lock the wheel assembly 30 to prevent movement of the cart 26 and/or the controller 56 may alert the crew member of a potential turbulent event. The crew member may use data regarding the potential locations of the turbulence event to decide when to provide services to the passengers.

Generally, the controller 56 is in communication with the wheel assembly 30, and is configured to automatically operate the primary brake assembly 46 to lock the cart 26 in position when the turbulence monitoring system 58 detects the turbulence event. Therefore, the primary brake assembly 46 may lock the cart 26 in response to the turbulence event being based on real-time environmental conditions or potential environmental conditions. Furthermore, the controller 56 may automatically signal the primary brake assembly 46 to unlock the cart 26 after the turbulence event is over.

The controller 56 includes a processor 60 and a memory 62. Therefore, instructions may be stored in the memory 62 of the controller 56 and automatically executed via the processor 60 of the controller 56 to provide the respective control functionality. That is, the controller 56 is configured to execute the instructions from the memory 62, via the processor 60. For example, the controller 56 may be a host machine or distributed system, e.g., a computer such as a digital computer or microcomputer, and, as the memory 62, tangible, non-transitory computer-readable memory such as read-only memory (ROM) or flash memory. The controller 56 may also have random access memory (RAM), electrically erasable programmable read-only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the controller 56 may include all software, hardware, memory 62, algorithms, connections, sensors, etc., necessary to control, for example, the primary brake assembly 46, the drive assembly 36, and the turbulence monitoring system 58, and other components/features discussed further below. As such, a control method operative to control the primary brake assembly 46, the drive assembly 36, and the turbulence monitoring system 58 may be embodied as software or firmware associated with the controller 56. It is to be appreciated that the controller 56 may also include any device capable of analyzing data from various sensors (some of which are discussed below), comparing data, making the necessary decisions required to control and/or monitor the primary brake assembly 46, the drive assembly 36, and the turbulence monitoring system 58, as well as other components/features discussed further below. The controller 56 may be in communication with the primary brake assembly 46, the drive assembly 36, and the turbulence monitoring system 58 via an electrical connection such as hard-wires or wirelessly, etc. Optionally, more than one controller 56 may be utilized.

In certain configurations, the turbulence monitoring system 58 may include a sensor 64 coupled to the cart 26. That is, the sensor 64 is mounted to the cart 26, and therefore, movement of the cart 26 also moves the sensor 64. The sensor 64 may be disposed along the cart 26 in any suitable location, which may be inside or outside of the compartment 28 of the cart 26. The sensor 64 of the turbulence monitoring system 58 is in communication with the controller 56. The controller 56 may be in communication with the sensor 64 via an electrical connection such as hard-wires or wirelessly, etc.

The sensor 64 of the turbulence monitoring system 58 detects real-time movements of the cart 26 and/or the aircraft 10, which is communicated to the controller 56, to detect the turbulence event. For example, if the turbulence monitoring system 58 detects movement of the cart 26 and/or the aircraft 10, such as sudden movement or a great amount of movement, the primary brake assembly 46 may be automatically activated, via the controller 56, to lock the wheel assembly 30 to prevent movement of the cart 26.

The sensor 64 of the turbulence monitoring system 58 may include a micro-electro-mechanical system (MEMS) sensor 66 that detects the real-time movements of the cart 26. For example, the MEMS sensor 66 may detect movements of the cart 26 and/or the aircraft 10 caused by turbulence. As such, real-time sudden movements of the aircraft 10 may be considered turbulence. Therefore, in this example, the turbulence monitoring system 58 utilizes data from the MEMS sensor 66 to detect the turbulence event, and if the turbulence event is detected, the controller 56 signals the primary brake assembly 46 to automatically active to lock the cart 26 in place.

In certain configurations, the MEMS sensor 66 may include a gyroscope 68. In other configurations, the MEMS sensor 66 may include an accelerometer 70. In yet other configurations, the MEMS sensor 66 may include both of the gyroscope 68 and the accelerometer 70. Furthermore, in certain configurations, the MEMS sensor 66 may include an inertial navigation sensor 72 to detect a relative position of the cart 26 within the cabin 18. The controller 56 may use the detected relative position of the cart 26 to determine whether to automatically lock the cart 26 in place for the turbulence event. For example, if the controller 56, using the inertial navigation sensor 72, detects the cart 26 is docked in the galley 24, then the controller 56 may not need to activate the primary brake assembly 46.

Additional non-limiting examples of the MEMS sensor 66 may include a gyrometer, a six-degrees of freedom (6DoF) movement mechanism, or any other suitable mechanisms, devices, components, sensors, etc. to detect the movements of the cart 26 and/or the aircraft 10.

An override switch 74 may be in communication with the controller 56 to override the primary brake assembly 46 if a fault occurs in the primary brake assembly 46. For example, if the primary brake assembly 46 will not unlock the plurality of wheels 32 after the turbulence event is over, then the override switch 74 may be activated to signal the controller 56 to override or deactivate the primary brake assembly 46. The controller 56 may be in communication with the override switch 74 via an electrical connection such as hard-wires or wirelessly, etc.

Turning to FIGS. 1 and 3, the aircraft 10 may include an onboard network system 76 (ONS) coupled to the fuselage 14. The controller 56 is in communication with the ONS 76, and therefore, the ONS 76 is also in communication with the turbulence monitoring system 58. The controller 56 may use data from the ONS 76 and the turbulence monitoring system 58 to detect the turbulence event.

The ONS 76 may also include a navigation system 78 that tracks the real-time position of the aircraft 10. For example, the navigation system 78 may include a global positioning system 80 (GPS) or any other positional tracking system to track the real-time position of the aircraft 10. Furthermore, the ONS 76 may store data regarding travel routes of the aircraft 10. The controller 56 may utilize the data of the real-time position of the aircraft 10 from the navigation system 78 in combination with the pre-programmed route that identifies the potential locations of the turbulence event to alert of a potential turbulence location. That is, the controller 56 of the cart 26 may alert of the potential turbulent event based on feedback from the real-time position of the aircraft 10 from the ONS 76 and the pre-programmed route of turbulence along the route the aircraft 10 is traveling. The ONS 76 may also include a MEMS sensor 82 to detect real-time movements of the aircraft 10, and thus, detect a real-time turbulence event. The controller 56 may use data from the MEMS sensor 82 of the ONS 76 to detect the turbulence event and determine whether to lock the cart 26 in place. The MEMS sensor 82 of the ONS 76 may include a gyroscope, an accelerometer, a gyrometer, a six-degrees of freedom (6DoF) movement mechanism, and/or any other suitable mechanisms, devices, components, sensors, etc. to detect the movements of the aircraft 10.

Referring to FIGS. 2 and 3, in certain configurations, the galley cart assembly 12 may include a mobile computing device 84 that is selectively attachable to the cart 26. That is, the mobile computing device 84 may be selectively docked to the cart 26. The mobile computing device 84 is used via the crew member for various reasons, some of which are discussed below. For example, the mobile computing device 84 may provide data to the crew member about the turbulence event so that the crew member may schedule passenger service according to that data. As another example, the mobile computing device 84 may provide a way for the crew member to enter or view information about various passengers, various inventory, etc.

Therefore, the mobile computing device 84 may include a display 86 to convey information to the crew member, such as the turbulence event. The mobile computing device 84 may also include a keyboard 88 to enter information into the mobile computing device 84, which may be a separate keyboard from the display 86 or a touch-screen keyboard that is visible on the display 86. Non-limiting examples of the mobile computing device 84 may include a tablet, a hand-held computer, integrated galley display device, etc.

The mobile computing device 84 is in communication with the controller 56. The controller 56 may be in communication with the mobile computing device 84 via an electrical connection such as hard-wires or wirelessly, etc. The controller 56 may be configured to send an alert to the mobile computing device 84 to notify of the turbulence event. That is, the controller 56 may send the alert to the mobile computing device 84 to notify of the real-time turbulence. Furthermore, the controller 56 may be configured to send an alert to the mobile computing device 84 to notify of the potential locations of the turbulence event. Therefore, the controller 56 may send the alert to the mobile computing device 84 regarding the turbulence event, which includes real-time turbulence and potential locations of turbulence. That is, the mobile computing device 84 may provide the alert to the crew member of any upcoming potential turbulence or real-time turbulence. Therefore, the alert regarding the turbulence event may be conveyed to the crew member via the display 86 of the mobile computing device 84, visually, and/or audibly via the mobile computing device 84.

Additionally, the crew member may manage the inventory within the cart 26 and/or information regarding the passenger such as whether every passenger has been attended to, sleep checks, passenger checklists, etc. via the mobile computing device 84. The crew member may enter data into the mobile computing device 84 via the keyboard 88 as each passenger is being attended to. The mobile computing device 84 may provide real-time monitoring of the inventory and passenger management, which may improve the passengers experience and/or reduce waste which may reduce costs.

The galley cart assembly 12 may also include a docking station 90 (see FIG. 2) in which the mobile computing device 84 is selectively attachable to the cart 26 via the docking station 90. The docking station 90 may be in communication with the controller 56. Therefore, when the mobile computing device 84 is attached to the docking station 90, data may be transferred between the mobile computing device 84 and the controller 56 via the docking station 90.

Generally, the galley cart assembly 12 also provides a way to power and/or charge various components. Therefore, the galley cart assembly 12 may include an energy storage system 92 (see FIGS. 2 and 3) to power and/or charge the various components. For example, the energy storage system 92 may power and/or charge the mobile computing device 84. As such, the docking station 90 may be electrically connected to the energy storage system 92, and therefore, may recharge a battery of the mobile computing device 84 when the mobile computing device 84 is docked on the docking station 90. As another example, the energy storage system 92 may power the drive assembly 36 and the primary brake assembly 46. The energy storage system 92 may include a battery 94 or a plurality of batteries 94, etc., and the battery 94 or the plurality of batteries 94 may be housed within the cart 26, such as for example, housed in the compartment 28 of the cart 26. Non-limiting examples of the battery 94 or the plurality of batteries 94 may include lithium-ion battery, nickel-cadmium battery, etc.

Figure 4:
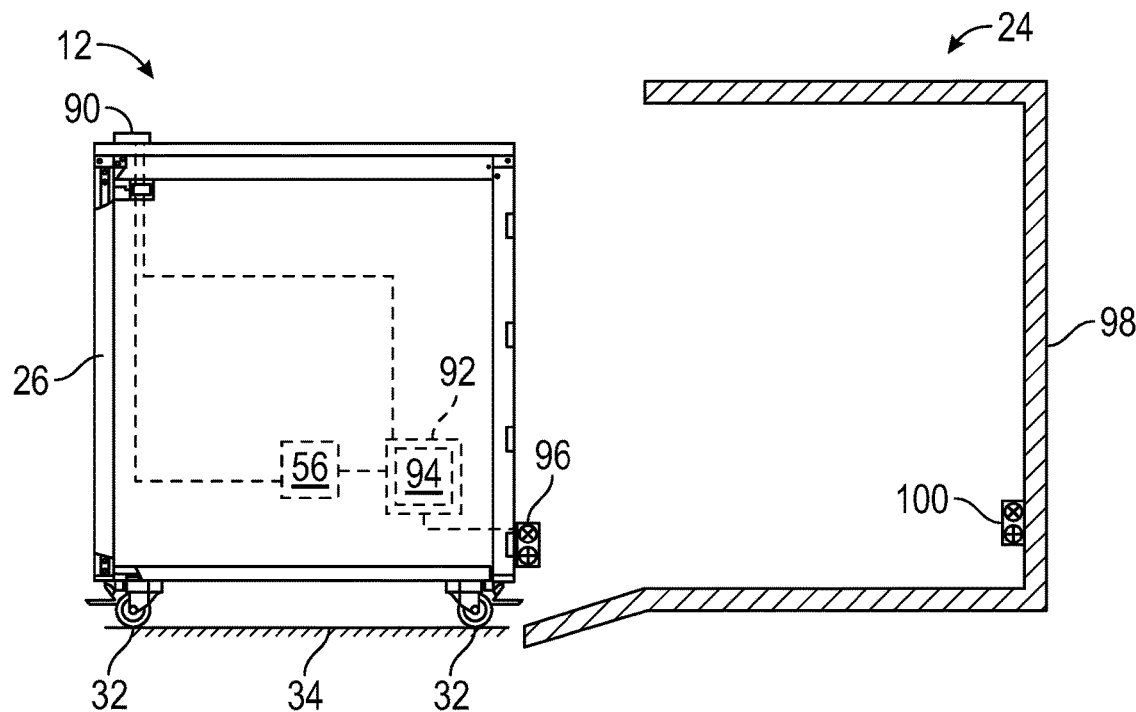
FIG. 4 is a schematic illustration of the galley cart assembly entering a charging station.

Referring to FIG. 4, the galley cart assembly 12 may also include a way to recharge the energy storage system 92 of the cart 26. Therefore, for example, the cart 26 may include a charging port 96 coupled to the energy storage system 92. The charging port 96 is accessible externally from the cart 26. The charging port 96 is configured to receive current to recharge the energy storage system 92. For example, the battery 94 or the plurality of batteries 94 may be electrically connected to the charging port 96 to recharge the energy storage system 92. It is to be appreciated that some of the features of the galley cart assembly 12 in FIG. 4 have been removed to illustrate other features.

The aircraft 10 may provide an outlet that cooperates with the charging port 96 to supply current to the energy storage system 92 of the cart 26. Specifically, the aircraft 10 may include a charging station 98 configured to recharge the energy storage system 92. For example, the charging station 98 may be disposed in the cabin 18, such as the galley 24, of the aircraft 10 or any other suitable location away from where the passengers are seated. When it is desirable to recharge the energy storage system 92 on the cart 26, the cart 26 may be docked in the charging station 98. The charging station 98 may include a power inlet 100 that the charging port 96 of the cart 26 plugs into to recharge the battery 94 or the plurality of batteries 94 of the cart 26. For example, when the cart 26 is docked in the charging station 98, the charging port 96 engages the power inlet 100 to transfer current to the energy storage system 92 of the cart 26, and thus, recharge the energy storage system 92. It is to be appreciated that the controller 56 may be in communication with the energy storage system 92, and the controller 56 may provide data to the crew member via the mobile computing device 84 regarding whether the energy storage system 92 needs recharging.

Turning back to FIGS. 2 and 3, the galley cart assembly 12 may provide a way to detect or identify whether any items have been left behind via the passengers. Therefore, the galley cart assembly 12 may further include a detection system 102 coupled to the cart 26, and the detection system 102 is in communication with the controller 56. Generally, the detection system 102 may be used to detect if one or more of the passengers left an object in the cabin 18 after the passengers have exited the aircraft 10. Therefore, the detection system 102 is configured to detect the object spaced away from the cart 26, which is communicated to the controller 56. For example, the detection system 102 may detect the object along the floor 34 of the cabin 18. Therefore, when the passengers exit the aircraft 10, the cart 26 may sweep the aisles 22 while the detection system 102 operates to determine whether any objects have been left on the floor 34 of the cabin 18. The detection system 102 may also improve the passengers experience by reducing incidences of personal belongings being left on the aircraft 10 after departure from the aircraft 10.

In certain configurations, the detection system 102 may include a sensor 104 coupled to the cart 26. For example, the sensor 104 of the detection system 102 may be disposed outside or externally of the cart 26. The sensor 104 of the detection system 102 may be any suitable sensor, and non-limiting examples may include a radio frequency sensor 106, an optical sensor 108, etc. Therefore, the detection system 102 may include the radio frequency sensor 106 disposed adjacent to one of the plurality of wheels 32 and configured to detect the object. The radio frequency sensor 106 uses radio waves to detect the object, and may include one or more antennas 109 to transmit/receive data regarding detecting the object. In other configurations, the detection system 102 may include the optical sensor 108 disposed adjacent to one of the plurality of wheels 32 and configured to detect the object. The optical sensor 108 may include a camera 110 to visually detect the object. In yet other configurations, the detection system 102 may include both of the radio frequency sensor 106 and the optical sensor 108. It is to be appreciated that the detection system 102 may include any suitable sensor, such as the radio frequency sensor 106, the optical sensor 108, etc., to detect the objects on the floor 34 of the cabin 18.

If the detection system 102 identifies an object is on the floor 34, the detection system 102 communicates such detection to the controller 56. An alert may be delivered to the mobile computing device 84 if the object is detected via the detection system 102. That is, the alert may be delivered to the mobile computing device 84, via the controller 56, in response to detection of the object via the detection system 102. The alert to the crew member may be conveyed visually via the display 86 and/or audibly via the mobile computing device 84.

Generally with regard to the figures, it is to be appreciated that some of the electrical connections/communication lines are excluded in various figures to illustrate other features.

Aspects of the present disclosure have been described in detail with reference to the illustrated configurations. Those skilled in the art will recognize, however, that certain modifications may be made to the disclosed structure and/or methods without departing from the scope of the present disclosure. The disclosure is also not limited to the precise construction and compositions disclosed herein. Modifications apparent from the foregoing descriptions are within the scope of the disclosure as defined by the appended claims. Moreover, the present concepts expressly include combinations and sub-combinations of the preceding elements and features.

What is claimed is:

1. A galley cart assembly comprising:
a cart;
a wheel assembly attached to the cart, and the wheel assembly includes a plurality of wheels and a drive assembly configured to drive one or more of the plurality of wheels to propel the cart, and the wheel assembly includes a primary brake assembly that engages one or more of the plurality of wheels to directly lock one or more of the plurality of wheels to prevent movement of the cart;
a controller coupled to the cart and including a processor and a memory, and wherein the controller includes a turbulence monitoring system configured to detect a turbulence event; and
wherein the controller is in communication with the wheel assembly, and is configured to automatically operate the primary brake assembly to engage the one or more of the plurality of wheels to lock the cart in position when the turbulence monitoring system detects the turbulence event.

2. The galley cart assembly as set forth in claim 1 wherein the turbulence monitoring system includes a sensor coupled to the cart and in communication with the controller, and wherein the sensor detects real-time movements of the cart, which is communicated to the controller, to detect the turbulence event.

3. The galley cart assembly as set forth in claim 2 wherein the sensor includes a micro-electro-mechanical system (MEMS) sensor that detects the real-time movements of the cart, and the turbulence monitoring system utilizes data from the MEMS sensor to detect the turbulence event.

4. The galley cart assembly as set forth in claim 3 wherein the MEMS sensor includes a gyroscope and/or an accelerometer.

5. The galley cart assembly as set forth in claim 3 wherein the MEMS sensor includes an inertial navigation sensor to detect a relative position of the cart within a cabin.

6. The galley cart assembly as set forth in claim 1 wherein the turbulence monitoring system includes a pre-programmed route that identifies potential locations of the turbulence event.

7. The galley cart assembly as set forth in claim 6:
further including a mobile computing device selectively attachable to the cart and in communication with the controller; and
wherein the controller is configured to send an alert to the mobile computing device to notify of the turbulence event and the potential locations of the turbulence event.

8. The galley cart assembly as set forth in claim 1 wherein the drive assembly includes a motor coupled to one of the plurality of wheels and the motor is activated to move the one of the plurality of wheels to propel the cart.

9. The galley cart assembly as set forth in claim 1 wherein the primary brake assembly includes a locking feature that engages the one or more of the plurality of wheels and is automatically activated to prevent movement of the one or more of the plurality of wheels to lock the cart in position when the turbulence monitoring system detects the turbulence event.

10. The galley cart assembly as set forth in claim 1 wherein the wheel assembly includes a secondary brake assembly operable separately from the primary brake assembly, and the secondary brake assembly is configured to manually lock the cart in position independently of the primary brake assembly.

11. The galley cart assembly as set forth in claim 1:
further including a mobile computing device selectively attachable to the cart and in communication with the controller; and
wherein the controller is configured to send an alert to the mobile computing device to notify of the turbulence event.

12. The galley cart assembly as set forth in claim 11 further including an energy storage system to power and/or charge the mobile computing device.

13. The galley cart assembly as set forth in claim 1 further including an energy storage system to power the drive assembly and the primary brake assembly.

14. The galley cart assembly as set forth in claim 13 wherein the cart includes a charging port coupled to the energy storage system and configured to receive current to recharge the energy storage system.

15. The galley cart assembly as set forth in claim 1:
further including a detection system coupled to the cart and in communication with the controller; and
wherein the detection system is configured to detect an object spaced away from the cart, which is communicated to the controller.

16. The galley cart assembly as set forth in claim 15 wherein the detection system includes a radio frequency sensor or an optical sensor disposed adjacent to one of the plurality of wheels and configured to detect the object.

17. The galley cart assembly as set forth in claim 16:
further including a mobile computing device selectively attachable to the cart and in communication with the controller; and
wherein an alert is delivered to the mobile computing device, via the controller, in response to detection of the object via the detection system.

18. An aircraft comprising:
a fuselage including a cabin having a plurality of seats and an aisle adjacent the plurality of seats;
an onboard network system coupled to the fuselage;
a galley cart assembly selectively movable along the aisle, the galley cart assembly comprising:
a cart;
a wheel assembly attached to the cart, and the wheel assembly includes a plurality of wheels and a drive assembly configured to drive one or more of the plurality of wheels to propel the cart, and the wheel assembly includes a primary brake assembly that engages one or more of the plurality of wheels to directly lock one or more of the plurality of wheels to prevent movement of the cart;
a controller coupled to the cart and including a processor and a memory, and wherein the controller is in communication with the onboard network system;
wherein the controller includes a turbulence monitoring system configured to detect a turbulence event; and
wherein the controller is in communication with the wheel assembly, and is configured to automatically operate the primary brake assembly to engage the one or more of the plurality of wheels to lock the cart in position when the turbulence monitoring system detects the turbulence event.

19. The aircraft as set forth in claim 18 wherein:
the onboard network system includes a navigation system that tracks a real-time position of the aircraft;
the turbulence monitoring system includes a pre-programmed route that identifies potential locations of the turbulence event; and
the controller utilizes data of the real-time position of the aircraft from the navigation system in combination with the pre-programmed route that identifies the potential locations of the turbulence event to alert of a potential turbulence location.

20. The aircraft as set forth in claim 18 wherein:
the galley cart assembly further includes a docking station and a mobile computing device selectively attachable to the cart via the docking station, and the mobile computing device is in communication with the controller; and
the mobile computing device is selectively coupled to the docking station to transfer information to the onboard network system.

21. The galley cart assembly as set forth in claim 1 wherein the primary brake assembly is incorporated into one or more of the plurality of wheels, and the primary brake assembly directly engages the one or more of the plurality of wheels to directly lock a respective one or more of the plurality of wheels to prevent rotation of the respective one or more of the plurality of wheels to lock the cart in place.

22. The galley cart assembly as set forth in claim 1 further including a shaft that connects a pair of the plurality of wheels and wherein the primary brake assembly engages the shaft of the pair of the plurality of wheels to directly lock the pair of the plurality of wheels to prevent rotation of the plurality of wheels to lock the cart in place.

* * * * *